United States Patent
Schofield et al.

(10) Patent No.: US 6,550,980 B2
(45) Date of Patent: Apr. 22, 2003

(54) OPTICAL FERRULE HAVING MULTIPLE ROWS OF MULTIPLE OPTICAL FIBERS

(75) Inventors: Philip W. Schofield, Oak Park, IL (US); Gene Shneyder, Wheeling, IL (US)

(73) Assignee: Stratos Lightwave, Inc., Chicago, IL (US)

(*) Notice: Subject to any disclaimer, the term of this patent is extended or adjusted under 35 U.S.C. 154(b) by 0 days.

(21) Appl. No.: 09/826,475

(22) Filed: Apr. 5, 2001

(65) Prior Publication Data

US 2002/0146216 A1 Oct. 10, 2002

(51) Int. Cl.[7] .................................................. G02B 6/36
(52) U.S. Cl. ............................................................ 385/83
(58) Field of Search ......................... 385/83, 56, 59, 385/71

(56) References Cited

U.S. PATENT DOCUMENTS

| 4,088,386 A | | 5/1978 | Hawk | 350/96 |
|---|---|---|---|---|
| 4,818,058 A | * | 4/1989 | Bonanni | 385/71 |
| 5,044,711 A | * | 9/1991 | Saito | 385/83 |
| 5,257,334 A | | 10/1993 | Takahashi | 385/65 |
| 5,933,564 A | * | 8/1999 | Pavlath | 385/83 |
| 6,062,740 A | * | 5/2000 | Ohtsuka et al. | 385/83 |
| 6,352,372 B1 | * | 3/2002 | Shahid | 385/59 |
| 6,364,539 B1 | * | 4/2002 | Shahid | 385/83 |

FOREIGN PATENT DOCUMENTS

| JP | 11-174274 | 7/1999 |
|---|---|---|
| JP | 2000-180670 | 6/2000 |

* cited by examiner

*Primary Examiner*—Lynn D. Feild
*Assistant Examiner*—Brian S. Webb
(74) *Attorney, Agent, or Firm*—Karl D. Kovach (57) ABSTRACT

A ferrule includes a body, a first cover, and a second cover. The body includes a first row of optical fiber receiving V-grooves, a second row of optical fiber receiving V-grooves, and a third row of optical fiber receiving apertures. Each aperture of the third row of optical fiber receiving apertures accommodates a respective optical fiber. The first cover is mounted to the body adjacent the first row of optical fiber receiving V-grooves. Each V-groove of the first row of optical fiber receiving V-grooves accommodates a respective optical fiber which is aligned therein by the first cover. The second cover is mounted to the body adjacent the second row of optical fiber receiving V-grooves. Each V-groove of the second row of optical fiber receiving V-grooves accommodates a respective optical fiber which is aligned therein by the second cover.

12 Claims, 6 Drawing Sheets

OPTICAL FERRULE HAVING MULTIPLE ROWS OF MULTIPLE OPTICAL FIBERS

BACKGROUND OF THE INVENTION

1. Field of the Invention

The present invention pertains to a ferrule which houses multiple optical fibers. The invention more particularly concerns a ferrule having multiple rows for housing the multiple optical fibers.

2. Discussion of the Background

The application of fiber optics to the telecommunication and data storage industries is expanding every day. Fiber optics enables the high-speed transmission of communications and data. Connectors for optical fibers can be found in the back of instrumentation, telecommunication, routing, and switching cabinets. These cabinets accept a large number of fiber optic connectors.

In order to increase the number of fiber optic connections, designers of cabinets have increased the density of connectors per unit area which are accepted by the cabinets. The number of connectors accepted by the cabinets are restricted by the physical size of the connectors and the space surrounding each connector that is required for its insertion and/or removal from the cabinet. However, to meet the increasing need for more bandwith, designers are challenged to find new ways of packaging the connectors into the cabinets.

Thus, there is a need to provide for an increase in the number of fiber optic connections that can be accommodated in a given unit area of a cabinet.

SUMMARY OF THE INVENTION

It is an object of the invention to provide a ferrule of an optical connector that increases the number of optical fibers which are accepted, per unit area, in a cabinet.

It is a further object of the invention to provide a ferrule of an optical connector that has multiple rows of multiple optical fibers.

It is another object of the invention to provide a ferrule of an optical connector that fits into a receptacle designed for a standard optical ferrule, where the standard optical ferrule conforms to one of the following commercialized industrial standards: SC, LC, MP, MPT, MPX, MT, and MACII.

In one form of the invention the ferrule includes a body, a first cover, and a second cover. The body includes a first row of optical fiber receiving V-grooves, a second row of optical fiber receiving V-grooves, and a third row of optical fiber receiving apertures. Each aperture of the third row of optical fiber receiving apertures accommodates a respective optical fiber. The first cover is mounted to the body adjacent the first row of optical fiber receiving V-grooves. Each V-groove of the first row of optical fiber receiving V-grooves accommodates a respective optical fiber which is aligned therein by the first cover. The second cover is mounted to the body adjacent the second row of optical fiber receiving V-grooves. Each V-groove of the second row of optical fiber receiving V-grooves accommodates a respective optical fiber which is aligned therein by the second cover. The first row of optical fiber receiving V-grooves is separated from the second row of optical fiber receiving V-grooves by the third row of optical fiber receiving apertures.

In another form of the invention, the ferrule includes a body, and a sleeve. The body includes a first row of optical fiber receiving V-grooves, a second row of optical fiber receiving V-grooves, and a third row of optical fiber receiving apertures. Each aperture of the third row of optical fiber receiving apertures accommodates a respective optical fiber. The sleeve is mounted on the body so as to retain the optical fibers in the optical fiber receiving V-grooves of the body. In one variation the sleeve slips over the body and is retained thereto by an adhesive or other bonding agent or weldment. In another variation, a circumference of the inside of the sleeve is smaller than the circumference of the body so the sleeve is pressed on the body. The first row of optical fiber receiving V-grooves is separated from the second row of optical fiber receiving V-grooves by the third row of optical fiber receiving apertures.

Thus, the invention achieves the objectives set forth above. The invention provides a ferrule which accepts more optical fibers per unit area than has previously been feasible.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENTS

Figure 1:
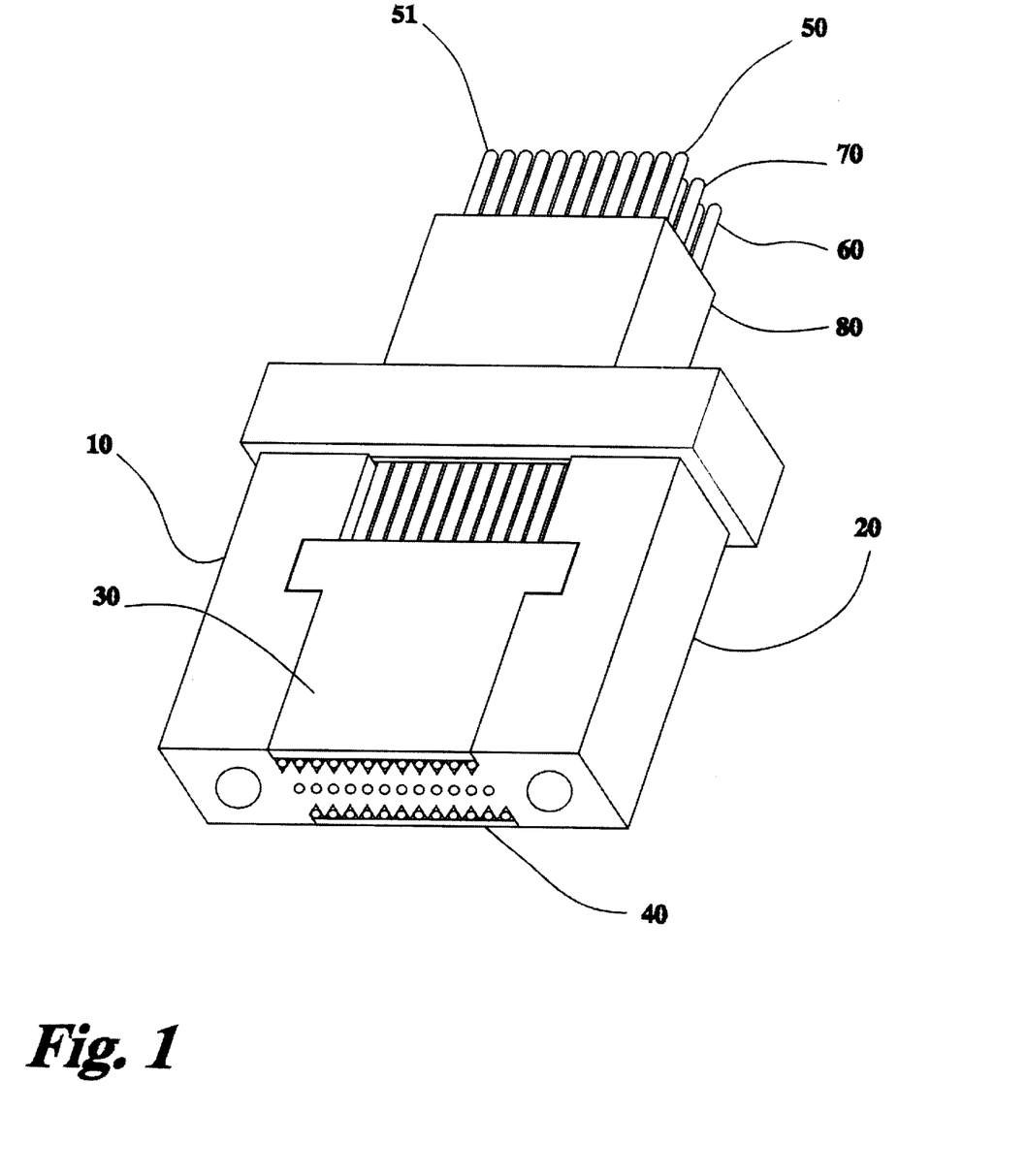
FIG. 1 is a perspective view of the ferrule of the invention.
Figure 2:
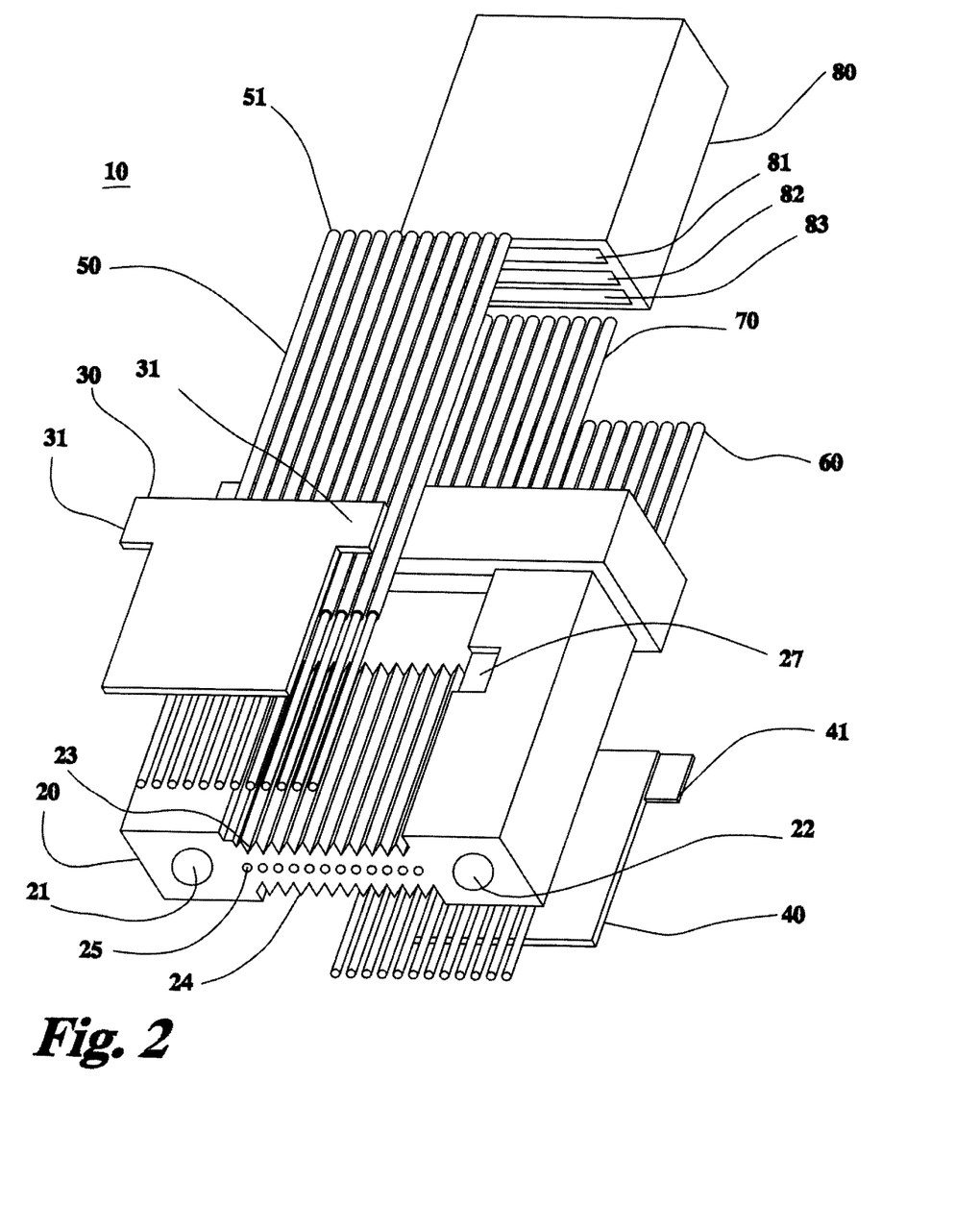
FIG. 2 is an exploded, perspective view of the ferrule of FIG. 1.
Figure 3:
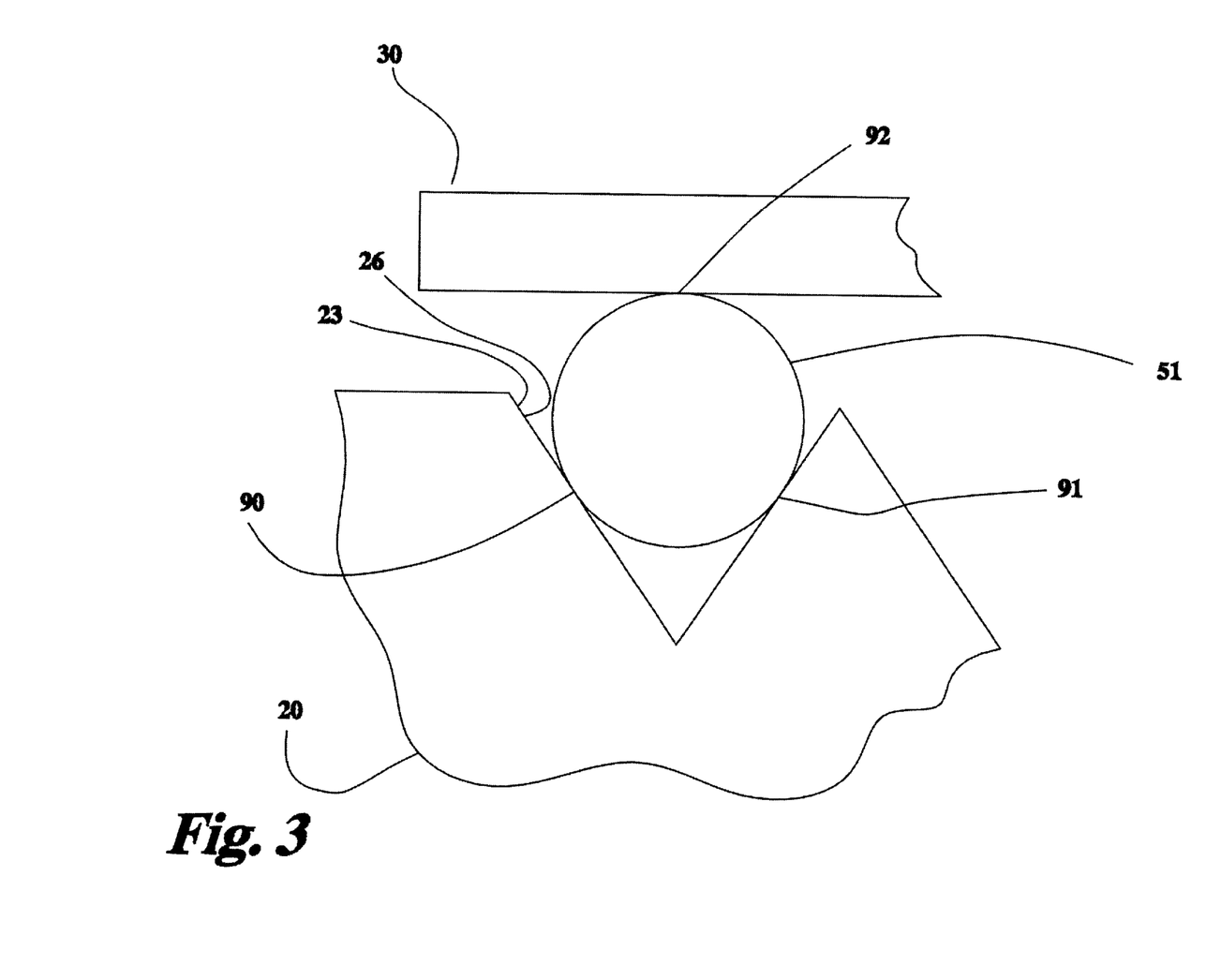
FIG. 3 is a partial, expanded, plan view of a single optical fiber positioned between the first cover and the body of the ferrule of FIG. 1.

Referring now to the drawings, wherein like reference numerals designate identical or corresponding parts throughout the several views, and more particularly to FIGS. 1–3 thereof, an embodiment of the present invention is a ferrule 10 which is displayed therein.

FIG. 1 is a perspective view of the ferrule 10. FIG. 1 shows the body 20, the first cover 30, the second cover 40, the fiber alignment block 80, the first row of optical fibers 50, the second row of optical fibers 60, and the third row of optical fibers 70. The third row of optical fibers 70 separates the first row of optical fibers 50 from the second row of optical fibers 60. The optical fibers of the first row of optical fibers 50 lie substantially in a first plane. The optical fibers of the second row of optical fibers 60 lie substantially in a second plane. The optical fibers of the third row of optical fibers 70 lie substantially in a third plane. Each row of optical fibers includes twelve optical fibers. Thus, the ferrule 10 accommodates thirty-six optical fibers. As compared to one commercialized industrial standard of optical connector as shown in U.S. Pat. No. 6,045,270 the number of optical fibers accommodated in the ferrule has tripled from twelve to thirty-six.

FIG. 2 is an exploded perspective view of the ferrule 10. The first cover 30 has tabs 31 which fit into complementary slots 27 formed in the body 20 so as to retain and position the first cover 30 therein. Similar to the first cover 30, the second cover 40 has tabs 41 which mate with complementary slots (not shown) of the body 20. Preferably, the first cover 30, the second cover 40, and the body 20 are made of a polymer material.

FIG. 3 is an expanded partial plan view of a single optical fiber 51, taken from the first row of optical fibers 50, positioned between the first cover 30 and the body 20 of the ferrule 10. The single optical fiber 51 is positioned in a first V-groove 26 of the first row of optical fiber receiving V-grooves 23. The first cover 30 aligns the single optical fiber 51 within the first V-groove 26. As shown, the single optical fiber 51 is aligned by way of three contact points. The first contact point 90 is between the single optical fiber 51 and the first V-groove 26, the second contact point 91 is between the single optical fiber 51 and the V-groove 26, and the third contact point 92 is between the single optical fiber 51 and the first cover 30. The V-grooves are so named since they have the general shape of the alphabetic character V. The V-groove is so named even if it is rotated any number of degrees such as ninety degrees or one-hundred-eighty degrees.

An adhesive can be placed between the first cover 30 and the body 20 in the region of the tabs 31 and the slots 27 and also in the region of the first row of optical fibers 50 adjacent to the first row of optical fiber receiving V-grooves 23 so as to secure the first cover 30 and the first row of optical fibers 50 to the body 20. Use of adhesives for bonding purposes are well known in the art. Likewise, the adhesive can be placed between the second cover 40 and the body 20 in the region of the tabs 41 and the slots and also in the region of the second row of optical fibers 60 adjacent to the second row of optical fiber receiving V-grooves 24 so as to secure the second cover 40 and the second row of optical fibers 60 to the body 20. The third row of optical fibers 70 are secured to the body 20 by placing the adhesive in each aperture of the third row of optical fiber receiving apertures 25 and then introducing the optical fibers of the third row of optical fibers 70 therein. Any optical fibers protruding beyond the end of the ferrule 10 are cleaved and/or polished until they are substantially flush with the end of the ferrule 10 as shown in FIG. 1.

The fiber alignment block 80 projects from one side of the body 20 and guides the optical fibers away from the ferrule 10. The fiber alignment block 80 includes a first aperture 81 for receiving and guiding the first row of optical fibers 50, a second aperture 83 for receiving and guiding the second row of optical fibers 60, and a third aperture 82 for receiving and guiding the third row of optical fibers 70. The fiber alignment block 80 is preferably made of a polymer material and is adhesively bonded to the body 20.

In one variation of the invention, the first cover 30 and the second cover 40 can be made of a translucent material and the adhesive can be of the type which is cured by ultraviolet radiation. Once the ferrule 10 is assembled, the assembly is exposed to ultraviolet radiation which passes through the first cover 30 and the second cover 40 so as to cure the ultraviolet sensitive adhesive, thus securing the assembly. Use of adhesives, which cure upon being exposed to ultraviolet radiation, for bonding purposes are well known in the art.

In use, the ferrule 10 can connect to another ferrule or it can attach to a complementary receptacle. Such complementary receptacles are disclosed in U.S. Pat. No. 6,045,270. One of the receptacles, as shown in U.S. Pat. No. 6,045,270, discloses the use of alignment pins which engage corresponding shapes in the connector. U.S. Pat. No. 6,045,270 is hereby incorporated herein by reference. As shown in FIGS. 1 and 2, the body 20 of the ferrule 10 can include alignment apertures or holes 21, 22 which are designed to accommodate corresponding alignment pins (not shown).

Figure 4:
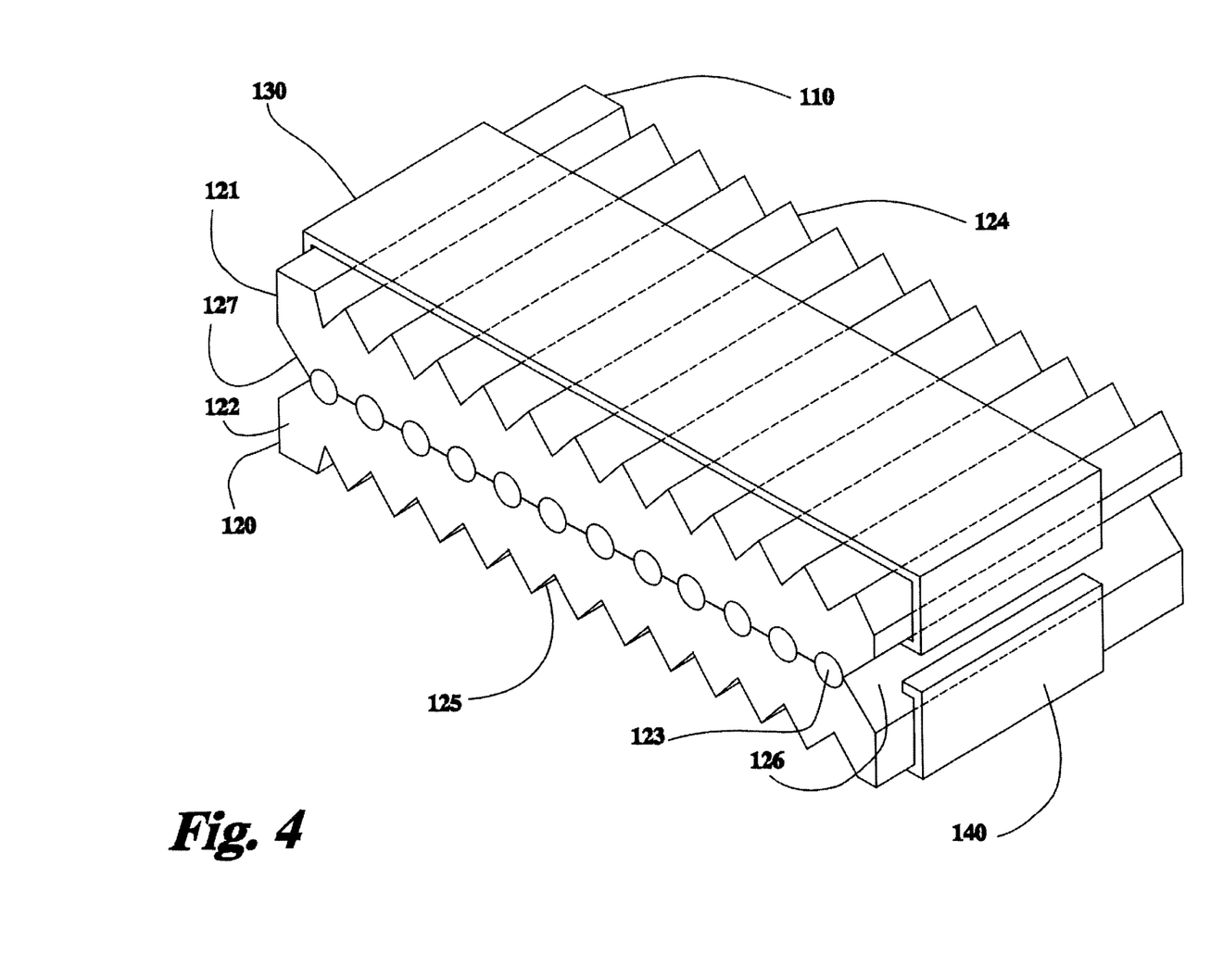
FIG. 4 is a perspective view of a second embodiment of the ferrule of the invention.

In yet another embodiment of the invention, FIG. 4 is a perspective view of a ferrule 1O. The ferrule 110 includes a body 120, a first cover 130, and a second cover 140. The body 120 is formed of two identical piece parts 121, 122. The parts 121, 122 are mounted to each other so as to form the third row of optical fiber receiving apertures 123. As in the previous embodiment, the body includes a first row of optical fiber receiving V-grooves 124 and a second row of optical fiber receiving V-grooves 125. In contrast to the previous embodiment, the body 120 of the ferrule 110 includes beveled edges 126, 127 which accept complementary alignment pins. Such an alignment method is described in U.S. Pat. No. 6,045,270. The first cover 130 and the second cover 140 snap onto the body 120 in the region of the beveled edges 126, 127 as shown in FIG. 4. The mounting of part 121 to part 122 can be by way of an adhesive or other suitable bonding technique.

The attachment of the first cover 130 and the second cover 140 to the body 120 are similar to that described in the previous embodiment. Furthermore, the attachment of the first row of optical fibers 50 (not shown), the second row of optical fibers 60 (not shown), and the third row of optical fibers 70 (not shown) are mated to the first row of optical fiber receiving V-grooves 124, the second row of optical fiber receiving V-grooves 125, and the third row of optical fiber receiving apertures 123, respectively, in a manner similar to the attachment of the optical fibers to the body and first and second covers as described in the previous embodiment.

Figure 5:
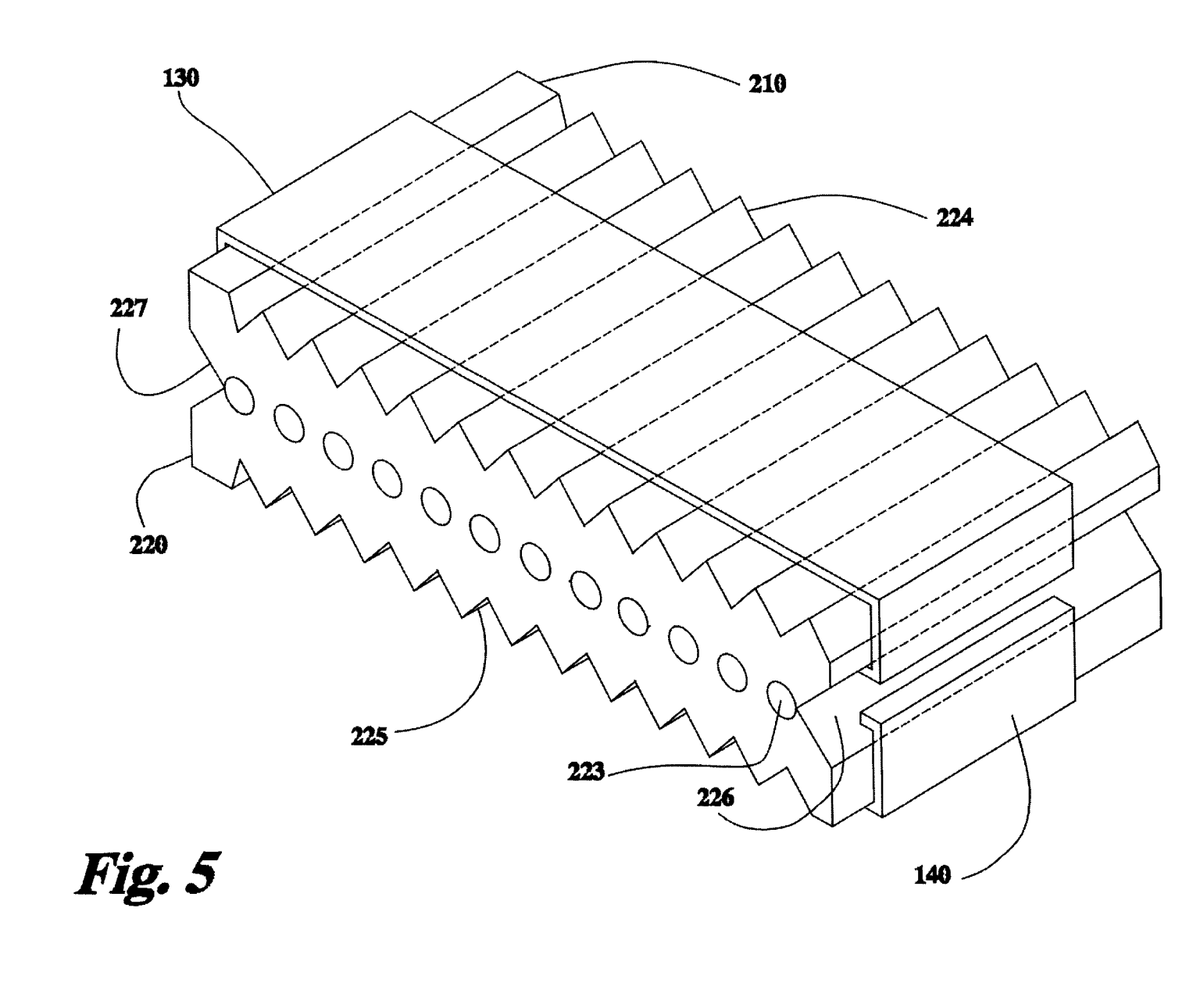
FIG. 5 is a perspective view of a third embodiment of the ferrule of the invention.

In still yet another embodiment of the invention, FIG. 5 is a perspective view of a ferrule 210. The ferrule 210 includes a body 220, the first cover 130, and the second cover 140. The ferrule 210 of FIG. 5 is similar to the ferrule 110 of FIG. 4, except that the body 220 of ferrule 210 is formed of one part and not of two parts as is the body 120 of ferrule 110. As in the previous embodiment, the body includes a first row of optical fiber receiving V-grooves 224 and a second row of optical fiber receiving V-grooves 225. The body 220 includes a third row of optical fiber receiving apertures 223. Also, the body 220 of the ferrule 210 includes beveled edges 226, 227 which accept complementary alignment pins. Such an alignment method is described in U.S. Pat. No. 6,045,270. The first cover 130 and the second cover 140 snap onto the body 220 in the region of the beveled edges 226, 227 as shown in FIG. 5. The covers 130 and 140 attach to the body 220 as in the previous embodiment.

Figure 6:
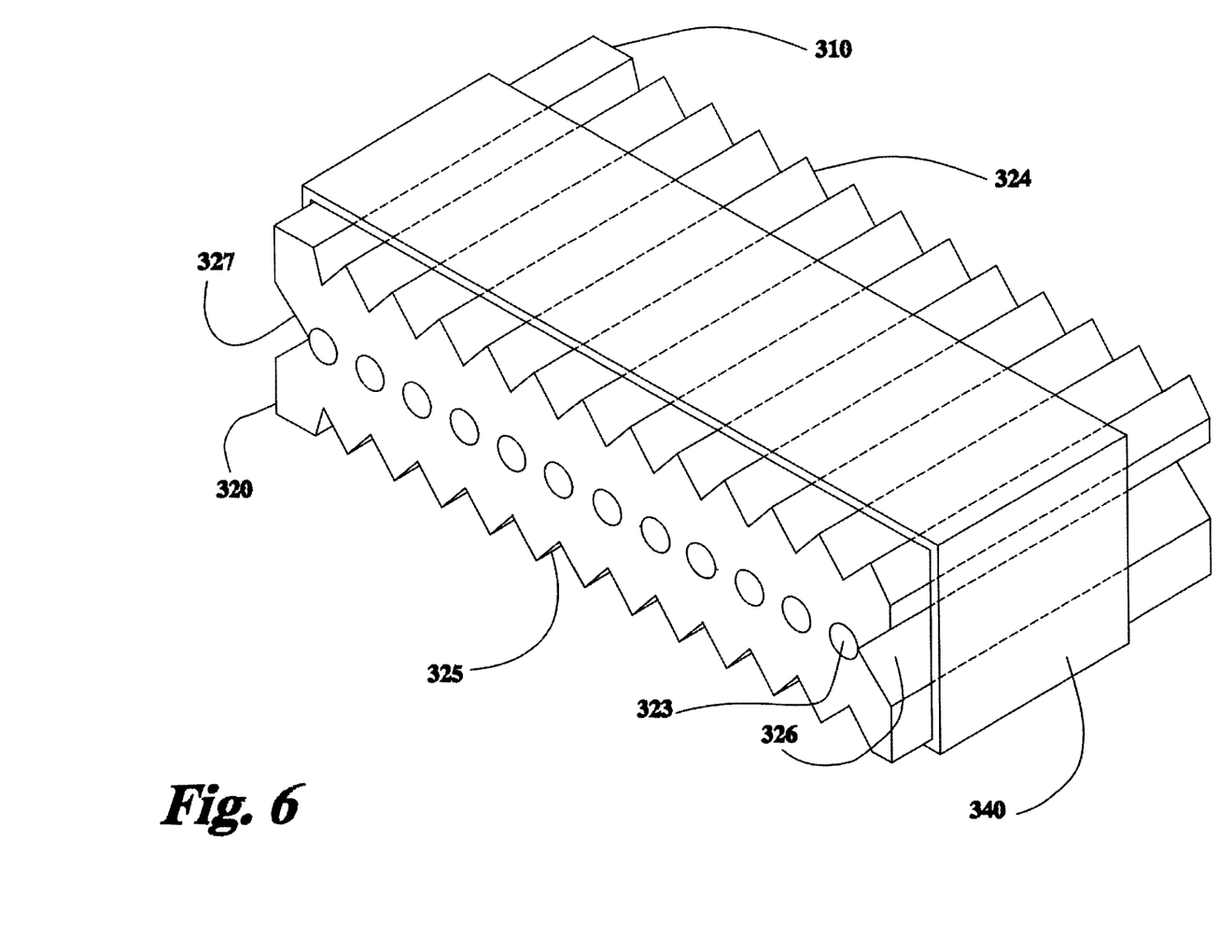
FIG. 6 is a perspective view of a fourth embodiment of the ferrule of the invention.

In yet still another embodiment of the invention, FIG. 6 is a perspective view of a ferrule 310. The ferrule 310 includes a body 320, and a sleeve 340. The body 320 of the ferrule 310 of FIG. 6 is substantially the same as the body 220 of the ferrule 210 as shown in FIG. 5. As in the previous embodiment, the body includes a first row of optical fiber receiving V-grooves 324 and a second row of optical fiber receiving V-grooves 325. The body 320 includes a third row of optical fiber receiving apertures 323. Also, the body 320 of the ferrule 310 includes beveled edges 326, 327 which accept complementary alignment pins. Such an alignment method is described in U.S. Pat. No. 6,045,270. In one variation, the sleeve 340 slides over the body 320 and is held in place with an adhesive or weldment so as to retain the optical fibers in the V-grooves 324, 325. In another variation, the inside circumference of the sleeve 340 is smaller than the outside circumference of the body 320, thus a press fit is produced between the body 320 and the sleeve 340 so as to retain the optical fibers in the V-grooves 324, 325. In the press fit variation, the sleeve 340 is retained on the body 320 by way of friction.

Obviously, numerous modifications and variations of the present invention are possible in light of the above teachings. It is therefore to be understood that within the scope of appended claims, the invention may be practiced otherwise than as specifically described herein.

What is claimed is:

1. A ferrule comprising:
   a one part body having a first row of optical fiber receiving V-grooves, a second row of optical fiber receiving V-grooves, and a third row of optical fiber receiving apertures, and wherein each aperture of the third row of optical fiber receiving apertures has a substantially circular shape;
   a first cover mounted to the one part body adjacent to the first row of optical fiber receiving V-grooves, and wherein the first cover adjacent to the first row of optical fiber receiving V-grooves is substantially flat; and
   a second cover mounted to the one part body adjacent to the second row of optical fiber receiving V-grooves, and wherein the second cover adjacent to the second row of optical fiber receiving V-grooves is substantially flat, and wherein
      each aperture of the third row of optical fiber receiving apertures accommodates a respective optical fiber, and wherein
      each V-groove of the first row of optical fiber receiving V-grooves accommodates a respective optical fiber which is aligned therein by the first cover, and wherein
      each V-groove of the second row of optical fiber receiving V-grooves accommodates a respective optical fiber which is aligned therein by the second cover, and wherein
      the ferrule has a generally rectangular shape, and wherein
      the one part body includes a first alignment hole for receiving a first alignment pin and a second alignment hole for receiving a second alignment pin, and wherein
      the one part body is made of a polymer material, and wherein
      the first cover is made of a polymer material, and wherein
      the second cover is made of a polymer material.

2. A ferrule according to claim 1 wherein the first cover is mounted to the one part body by way of an adhesive material.

3. A ferrule according to claim 2 wherein the second cover is mounted to the one part body by way of an adhesive material.

4. A ferrule according to claim 1 wherein the first cover is made of a translucent material.

5. A ferrule according to claim 4 wherein the first cover is mounted to the one part body by way of ultraviolet curing.

6. A ferrule according to claim 5 wherein the second cover is made of a translucent material.

7. A ferrule according to claim 6 wherein the second cover is mounted to the one part body by way of ultraviolet curing.

8. A ferrule according to claim 7 wherein the first row of optical fiber receiving V-grooves is separated from the second row of optical fiber receiving V-grooves by the third row of optical fiber receiving apertures.

9. A ferrule according to claim 8 wherein each V-groove of the first row of optical fiber receiving V-grooves is substantially parallel to each V-groove of the second row of optical fiber receiving V-grooves and to each aperture of the third row of optical fiber receiving apertures.

10. A ferrule comprising:
    a one part body having a first row of optical fiber receiving V-grooves, a second row of optical fiber receiving V-grooves, and a third row of optical fiber receiving apertures, and wherein each aperture of the third row of optical fiber receiving apertures accommodates a respective optical fiber, and wherein each aperture of the third row of optical fiber receiving apertures has a substantially circular shape;
    a first cover mounted to the one part body adjacent to the first row of optical fiber receiving V-grooves, and wherein each V-groove of the first row of optical fiber receiving V-grooves accommodates a respective optical fiber which is aligned therein by the first cover, and wherein the first cover adjacent to the first row of optical fiber receiving V-grooves is substantially flat; and
    a second cover mounted to the one part body adjacent to the second row of optical fiber receiving V-grooves, and wherein each V-groove of the second row of optical fiber receiving V-grooves accommodates a respective optical fiber which is aligned therein by the second cover, and wherein the second cover adjacent to the second row of optical fiber receiving V-grooves is substantially flat, and wherein
       the first row of optical fiber receiving V-grooves is separated from the second row of optical fiber receiving V-grooves by the third row of optical fiber receiving apertures, and wherein
       each V-groove of the first row of optical fiber receiving V-grooves substantially lies in a first plane, and wherein each V-groove of the second row of optical fiber receiving V-grooves substantially lies in a second plane, and wherein each aperture of the third row of optical fiber receiving apertures substantially lies in a third plane, and wherein
       the first plane is substantially parallel to the second plane, and wherein the first plane is substantially parallel to the third plane.

11. A ferrule comprising:
    a one part body having a first row of optical fiber receiving V-grooves, a second row of optical fiber receiving V-grooves, and a third row of optical fiber receiving apertures, and wherein each aperture of the third row of optical fiber receiving apertures has a substantially circular shape; and
    a sleeve mounted on the one part body adjacent to the first row of optical fiber receiving V-grooves, and the second row of optical fiber receiving V-grooves, and wherein the sleeve adjacent to the first row of optical fiber receiving V-grooves is substantially flat.

12. A ferrule comprising:
    a body having a first row of optical fiber receiving V-grooves, a second row of optical fiber receiving V-grooves, and a third row of optical fiber receiving apertures, and wherein the first row of optical fiber receiving V-grooves is separated from the second row of optical fiber receiving V-grooves by the third row of optical fiber receiving apertures, and wherein each V-groove of the first row of optical fiber receiving V-grooves substantially lies in a first plane, and wherein each V-groove of the second row of optical fiber receiving V-grooves substantially lies in a second plane, and wherein each aperture of the third row of optical fiber receiving apertures substantially lies in a third plane, and wherein the first plane is substantially parallel to the second plane, and wherein the first plane is substantially parallel to the third plane, and the body has a first length;

a first cover mounted to the body adjacent to the first row of optical fiber receiving V-grooves, and the first cover having a second length; and a second cover mounted to the body adjacent to the second row of optical fiber receiving V-grooves, and the second cover having a third length, and wherein the second length of the first cover is substantially equal to the third length of the second cover, and wherein the first length of the body is different than the second length of the first cover.

* * * * *

UNITED STATES PATENT AND TRADEMARK OFFICE
CERTIFICATE OF CORRECTION

PATENT NO.    : 6,550,980 B2
DATED         : April 22, 2003
INVENTOR(S)   : Schofield et al.

It is certified that error appears in the above-identified patent and that said Letters Patent is hereby corrected as shown below:

<u>Title page,</u>
Item [75], Inventors, change "Gene Shneyder" to -- Gene Schneider --.

Signed and Sealed this

Twelfth Day of August, 2003

JAMES E. ROGAN
*Director of the United States Patent and Trademark Office*